(12) United States Patent
Kieffel et al.

(10) Patent No.: US 10,770,198 B2
(45) Date of Patent: Sep. 8, 2020

(54) METHOD AND FACILITY FOR FILLING A GAS-INSULATED ELECTRICAL APPARATUS COMPRISING A MIXTURE OF (CF3)2CFCN AND CO2

(71) Applicant: General Electric Technology GmbH, Baden (CH)

(72) Inventors: Yannick Kieffel, Saint Jean de Bournay (FR); François Biquez, Pugny-Chatenod (FR); Jacques Porte, Lyons (FR)

(73) Assignee: General Electric Technology GmbH, Baden (CH)

( * ) Notice: Subject to any disclaimer, the term of this patent is extended or adjusted under 35 U.S.C. 154(b) by 108 days.

(21) Appl. No.: 15/778,538

(22) PCT Filed: Nov. 29, 2016

(86) PCT No.: PCT/EP2016/079148
§ 371 (c)(1),
(2) Date: May 23, 2018

(87) PCT Pub. No.: WO2017/093259
PCT Pub. Date: Jun. 8, 2017

(65) Prior Publication Data
US 2018/0358148 A1    Dec. 13, 2018

(30) Foreign Application Priority Data

Nov. 30, 2015   (EP) .................................... 15306895

(51) Int. Cl.
*H01B 3/56*         (2006.01)
*F17C 5/06*         (2006.01)
(Continued)

(52) U.S. Cl.
CPC ................. *H01B 3/56* (2013.01); *F17C 5/06* (2013.01); *F17C 13/028* (2013.01); *G05D 16/02* (2013.01);
(Continued)

(58) Field of Classification Search
CPC ........ H01B 3/56; H01H 33/56; H01H 33/562; H01H 33/563; H01H 2033/566;
(Continued)

(56) References Cited

U.S. PATENT DOCUMENTS 3,868,963 A * 3/1975 Muellerpoths ........ F17C 13/025
                                                  137/340
4,607,245 A * 8/1986 Kuroda .................... H01F 27/18
                                                  174/11 R
(Continued)

FOREIGN PATENT DOCUMENTS

WO    WO-2010043268 A1 *  4/2010  ........... H01H 33/563
WO       2013-045397 A1     4/2013
(Continued)

OTHER PUBLICATIONS

International Search Report for International Application No. PCT/EP2016/079148, dated Feb. 8, 2017.
(Continued)

*Primary Examiner* — Matthew W Jellett
(74) *Attorney, Agent, or Firm* — Eversheds Sutherland (US) LLP (57) ABSTRACT

A method and a facility for filling a high- or medium-voltage gas-insulated electrical apparatus in which the insulating gas comprises a mixture of heptafluoroisobutyronitrile ((CF$_3$)$_2$CFCN) and carbon dioxide. The method and the facility using a mixture of (CF$_3$)$_2$CFCN and CO$_2$ in pressurised liquid form which is heated to a temperature no lower than the critical temperature of the mixture.

10 Claims, 2 Drawing Sheets (51) Int. Cl.
*H01H 33/56* (2006.01)
*G05D 16/20* (2006.01)
*G05D 16/02* (2006.01)
*F17C 13/02* (2006.01)
*H02B 13/055* (2006.01)

(52) U.S. Cl.
CPC ......... *G05D 16/20* (2013.01); *G05D 16/2013* (2013.01); *H01H 33/56* (2013.01); *H01H 33/562* (2013.01); *H01H 33/563* (2013.01); *F17C 2227/0304* (2013.01); *F17C 2227/0325* (2013.01); *H01H 2033/566* (2013.01); *H01H 2033/568* (2013.01); *H02B 13/055* (2013.01)

(58) Field of Classification Search
CPC ... H01H 2033/568; H02B 13/055; F17C 5/06; F17C 13/028; F17C 2227/0304; F17C 2227/0325; Y10T 137/7761; G05D 16/02; G05D 16/20; G05D 16/2013
USPC .......................................................... 141/82
See application file for complete search history.

(56) References Cited

U.S. PATENT DOCUMENTS

| | | | | |
|---|---|---|---|---|
| 5,146,105 A * | 9/1992 | Obata | .................. | B25J 19/0079 174/11 R |
| 6,076,359 A * | 6/2000 | Jurcik | ...................... | F17C 7/04 62/50.2 |
| 6,966,934 B1 * | 11/2005 | Sato | ..................... | B01D 53/002 210/640 |
| 9,127,361 B2 * | 9/2015 | Ding | .................. | C23C 16/45557 |
| 9,263,862 B2 * | 2/2016 | Kramer | ............... | G01N 33/0032 |
| 9,837,801 B2 * | 12/2017 | Kieffel | ...................... | H01B 3/56 |
| 10,443,784 B2 * | 10/2019 | Miyoshi | ..................... | F17C 13/026 |
| 2009/0109604 A1 * | 4/2009 | Yanabu | ..................... | H01B 3/56 361/618 |
| 2017/0352509 A1 | 12/2017 | Biquez | | |
| 2018/0040391 A1 | 2/2018 | Kieffel et al. | | |
| 2018/0135804 A1 * | 5/2018 | Sieber | ...................... | H01B 3/56 |
| 2019/0154202 A1 * | 5/2019 | Cho | ........................ | F17C 13/04 |

FOREIGN PATENT DOCUMENTS

| | | | | |
|---|---|---|---|---|
| WO | 2014-037031 A1 | | 3/2014 | |
| WO | 2014-037566 A1 | | 3/2014 | |
| WO | WO-2014037031 A1 | * | 3/2014 | ............... H01B 3/56 |
| WO | 2015-040069 A1 | | 3/2015 | |

OTHER PUBLICATIONS

Written Opinion for International Application No. PCT/EP2016/079148, dated Feb. 8, 2017.
Preliminary European Search Report for Application No. 15306895.2, dated Apr. 20, 2016.
International Preliminary Report on Patentability for PCT/EP2016/079148, dated Oct. 20, 2017.
K.G. Joback and R.C. Reid, "Estimation of Pure-Component Properties from Group-Contributions", Chem. Eng. Comm. 1987, vol. 57: pp. 233-243.
U.S. Appl. No. 15/580,981; entitled "Gas-Insulated Electrical Apparatus Filled With a Dielectric Gas", filed Dec. 8, 2017.

* cited by examiner

METHOD AND FACILITY FOR FILLING A GAS-INSULATED ELECTRICAL APPARATUS COMPRISING A MIXTURE OF (CF3)2CFCN AND CO2

CROSS-REFERENCE TO RELATED APPLICATIONS

This is a National Stage application of PCT international application PCT/EP2016/079148, filed on Nov. 29, 2016 which claims the priority of European Patent Application No. 15 306895.2, filed Nov. 30, 2015, both of which are incorporated herein by reference in their entirety.

TECHNICAL FIELD

The invention relates to the field of electrical insulation and electric arc extinction in high- or medium-voltage equipment.

More particularly, the present invention relates to a method and an installation for filling gas-insulated high- or medium-voltage equipment for which the insulation gas comprises a mixture of heptafluoroisobutyronitrile (($CF_3$)$_2$CFCN) and carbon dioxide.

STATE OF THE PRIOR ART

In equipment for a transmission line carrying high- or medium-voltage electricity, the functions of electrical insulation and of electric arc extinction are typically performed by a gas that is confined to the inside of the equipment.

Currently, sulfur hexafluoride ($SF_6$) is the most frequently used gas. That gas presents dielectric strength that is relatively high, good thermal conductivity, and low dielectric losses. It is chemically inert, non-toxic for humans and animals and, after being dissociated by an electric arc, it recombines quickly and almost completely. In addition, it is non-flammable and its price is still moderate.

However, $SF_6$ has the major disadvantage of presenting a global warming potential (GWP) of 23 500 (relative to carbon dioxide ($CO_2$) over 100 years) and a time period spent in the atmosphere of 3200 years, which places it among very strong greenhouse gases. $SF_6$ was thus added by the Kyoto Protocol (1997) to the list of gases for which emissions must be limited.

The best way to limit $SF_6$ emissions consists in limiting the use of said gas, and that has led industry to seek alternatives to $SF_6$.

To that end, a new gas presenting electrical insulation properties that are sufficient for an application in the field of high- or medium-voltage apparatus has been developed. More precisely, that gas is a mixture of two molecules: one is present in a great majority and the second is heptafluoroisobutyronitrile and is present in a smaller amount. This gas mixture has the advantage of being based on an $SF_6$ substitute presenting a GWP that is less than that of $SF_6$ in solution in a host or dilution gas having a very low GWP, such as $CO_2$ having a GWP that is equal to 1, or of GWP that is zero, such as for nitrogen ($N_2$) or air.

International application WO 2014/037566 describes the use of such mixtures as an insulation gas in high- or medium-voltage equipment, associated with solid insulation. A particular insulation gas, namely comprising heptafluoroisobutyronitrile, carbon dioxide, and oxygen, oxygen being present in said gas medium in a molar percentage lying in the range 1% to 25%, is described in international application WO 2015/040069.

For the moment, no simple means exist for making it possible to fill high- or medium-voltage equipment with a gas mixture comprising at least two distinct components such as a mixture of heptafluoroisobutyronitrile and carbon dioxide: all current methods of filling present one or more drawbacks.

A first filling method is performed from two separate containers by adding the partial pressures for each component. The drawback of that method is that it requires two separate containers to be manipulated and that the mixture created is not immediately homogeneous and therefore takes time to become homogenized. That implementation is complex and may lead to errors of implementation on site if the partial pressures of each component are not complied with.

Another filling method uses a gas mixer, but this implementation is complex and relies on the use of expensive gas mixers.

Finally, a last filling method implements a liquefied mixture and either the gas phase, or the liquid phase is taken. That implementation suffers from the non-stability of the ratio between the two components as a function of the filling rate of the bottle. Indeed, the two components such as heptafluoroisobutyronitrile and $CO_2$ do not have the same boiling points. Since the vapor pressure of $CO_2$ is greater than that of heptafluoroisobutyronitrile, $CO_2$ thus tends to exit first, thereby enriching the remaining mixture in heptafluoroisobutyronitrile.

The inventors have thus set themselves the aim of finding a method and a facility for filling equipment for a high- or medium-voltage electricity transmission line with a gas mixture comprising $CO_2$ and heptafluoroisobutyronitrile that can guarantee accuracy and stability of the $CO_2$ to heptafluoroisobutyronitrile ratio during filling.

SUMMARY OF THE INVENTION

The invention provides a method and an installation making it possible to overcome all or some of the drawbacks and difficulties encountered in the methods and installations of the prior art.

Indeed, the present invention provides a method and an installation making it possible to fill high- or medium-voltage equipment with a gas for electrical insulation and/or for electric arc extinction comprising heptafluoroisobutyronitrile and carbon dioxide, said method and said use making it possible to transfer, in accurate manner, the gas mixture with the ratio of the components of the mixture being controlled and stable during filling. This stability is provided whatever the level of liquid or gas in the original container of the mixture comprising heptafluoroisobutyronitrile and carbon dioxide and whatever the outside temperature during filling.

In the equipment to be filled in the context of the present invention, the insulating medium is used exclusively in gaseous form. However, for storage and transport, it is preferable, for space-saving reasons, to liquefy the medium. Gas is liquefied by compression, by cooling, or on an industrial scale by combining compression and cooling. Then, it passes back to the gaseous state by vaporization and expansion of the gas. For a gas formed of only one component, this process is relatively simple.

However, in the present invention, the medium is composed of at least two distinct components. It is thus advisable to make sure that vaporization occurs in homogeneous manner. The work of the inventors has made it possible to show that using the gas mixture in a supercritical state makes it possible to overcome such a technical problem. Indeed, in the supercritical state, the mixture occupies all of the physical volume and behaves like a single gas having the density of the liquid. Passage into the supercritical state takes place by heating the liquid under pressure until exceeding the critical point, which is defined by its critical temperature and pressure. The critical temperature and pressure depend on the molar fraction, the critical molar volume, and the critical temperature of each compound making up the composition of the mixture.

The critical temperature of simple gas mixtures may be estimated using the formula established by C. C. Li in 1971:

$$T_{cr_{mix}} = \sum \phi_{cri} * T_{cri} \text{ with:} \quad (1)$$

$$\phi_{cri} = \frac{V_{cri}X_i}{\sum V_{cri}X_i} \quad (2)$$

in which:
  $X_i$ is the molar fraction of the component i in the mixture;
  $V_{cri}$ is the critical molar volume of the component i; and
  $T_{cri}$ is the critical temperature of the component i.

The critical temperature and critical molar volume for $CO_2$ are available in the literature. The critical temperature of $CO_2$ is of 31° C. and its critical molar volume is of 94 $cm^3$.

For heptafluoroisobutyronitrile, the critical temperature is of 109° C. and its critical volume has been estimated using the relationship of K. G. JOBACK and R. C. REID (Chem. Eng. Comm., 1987, vol. 57, pages 233-243) given by the following expression:

$$V_{cri} = 17.5 + \Sigma V_{cri}(\text{chemical group}) \quad (3)$$

The heptafluoroisobutyronitrile, or iso-$C_3F_7CN$, may be broken up into >C<, —F, and C≡N, groups having respective critical molar volumes of 27 $cm^3$, 27 $cm^3$, and 91 $cm^3$.

The critical molar volume of heptafluoroisobutyronitrile is thus:

$$V_{cri}(\text{iso-}C_3F_7CN) = 17.5 + 3*27 + 7*27 + 91 = 378.5 \text{ cm}^3$$

Thus, the present invention provides a method of filling a closed casing (1) containing at least one electrical component of equipment for a high- or medium-voltage electricity transmission line, with a gas mixture comprising heptafluoroisobutyronitrile and carbon dioxide in predefined proportions, said method comprising the steps consisting in:

a) preparing, in a container (2), a pressurized liquid mixture comprising heptafluoroisobutyronitrile and carbon dioxide in predefined proportions;

b) heating, in the container (2), the pressurized liquid mixture prepared in said step a) until it reaches a temperature that is higher than or equal to the critical temperature of the mixture whereby a gas mixture comprising heptafluoroisobutyronitrile and carbon dioxide in predefined proportions is obtained; and c) transferring said gas mixture obtained in step b) from the container (2) to the casing (1) via a transfer circuit (3) in which the gas mixture is decompressed (expanded) and maintained at a temperature that is higher than the liquefaction temperature of heptafluoroisobutyronitrile at its partial pressure in the transfer circuit (3) before it enters the casing (1) to be filled.

In such a method, once the equipment is filled it contains heptafluoroisobutyronitrile and $CO_2$ in gaseous form only, so that no excess of heptafluoroisobutyronitrile is used.

In a first implementation, the heating of the mixture comprising heptafluoroisobutyronitrile and carbon dioxide in pressurized liquid form so as to form a gas mixture comprising these two components during step b) is performed by a heater member (4) outside the container (2).

In a second implementation, said heating is performed by a heater member (5) inside the container (2).

In a third implementation, heating is performed both by a heater member (4) outside the container (2) and by a heater member (5) inside the container (2).

Several monitoring steps can be envisaged within the context of the method of the present invention in order to ensure the equipment is filled with a gas mixture comprising heptafluoroisobutyronitrile and carbon dioxide in predefined proportions.

To this end, during the transfer step c), the molar ratio between heptafluoroisobutyronitrile and carbon dioxide in the gas mixture is measured.

In addition, during the transfer step c), the temperature of the gas mixture in the container (2) is measured.

Finally, the temperature at the level of the heater members (4, 5) is measured.

In the light of at least one of these three measurements, the heating power during the heating step b) may be adjusted and/or regulated on the basis of the measured molar ratio between heptafluoroisobutyronitrile and carbon dioxide during the transfer step c), on the basis of the measured temperature of the gas mixture in the container (2) during the transfer step c) and before its expansion, and/or on the basis of the measured heater members (4, 5).

The present invention implements a liquid or gas mixture comprising heptafluoroisobutyronitrile and carbon dioxide in predefined proportions.

The liquid or gas mixture may contain nothing other than heptafluoroisobutyronitrile and carbon dioxide and thus be constituted by these two components only.

In a variant, this liquid or gas mixture may contain at least one other element in addition to heptafluoroisobutyronitrile and carbon dioxide. Typically, it further comprises oxygen.

The present invention also relates to an installation for filling a closed casing (1) containing at least one electrical component of equipment for a high- or medium-voltage electricity transmission line with a gas mixture comprising heptafluoroisobutyronitrile and carbon dioxide in predefined proportions.

The installation comprises:

a container (2) suitable for (capable of/for) containing a mixture comprising heptafluoroisobutyronitrile and carbon dioxide in predefined proportions;

a heater member (4, 5) suitable for (capable of/for) heating, in the container (2), the mixture comprising heptafluoroisobutyronitrile and carbon dioxide in predefined proportions present in the form of a pressurized liquid until it reaches a temperature that is higher than or equal to the critical temperature of the mixture whereby a gas mixture comprising heptafluoroisobutyronitrile and carbon dioxide in predefined proportions is obtained; and a transfer circuit (3) suitable for (capable of/for) transferring the gas mixture comprising heptafluoroisobutyronitrile and carbon dioxide in predefined proportions from the container (2) to the casing (1), said transfer circuit fully connecting said container (2) with said casing (1) and said transfer circuit having an expansion member (6) suitable for (capable of/for) reducing the pressure of the gas mixture to a determined value with a view to filling the casing (1) and means (7) suitable (capable of/for) maintaining the gas mixture at a temperature that is higher than the liquefaction temperature of heptafluoroisobutyronitrile at its partial pressure in the transfer circuit (3).

Typically, the filling installation of the present invention comprises on or more temperature safety feature(s).

In the filling installation of the present invention, the transfer circuit (3) has means (8) suitable for (capable of/for) measuring the molar ratio between heptafluoroisobutyronitrile and carbon dioxide in the gas mixture.

In addition, in the filling installation of the present invention, the transfer circuit (3) presents a temperature sensor (9) suitable for (capable of/for) measuring the temperature of the gas mixture in the container (2).

Other characteristics and advantages of the present invention will also appear to the person skilled in the art on reading the examples given below by way of non-limiting illustration and with reference to the accompanying figures.

DETAILED DESCRIPTION OF PARTICULAR EMBODIMENTS

Above and below, the expression "high voltage" is used in the conventionally accepted manner, i.e. the expression "high voltage" refers to a voltage that is strictly greater than 52,000 volts (V) for alternating current (AC) and 75,000 volts for direct current (DC).

In the context of the invention, the expression "medium voltage" is used in the conventionally accepted manner, i.e. the term "medium voltage" refers to a voltage that is greater than 1000 V for AC or greater than 1500 V for DC, but that does not exceed 52,000 V for AC, or 75,000 V for DC.

An electrical apparatus mainly comprises a longitudinal outer casing or enclosure (1), defining a hollow volume and one or more electrical component(s) that is/are arranged inside the casing.

The inside volume of the casing is closed in gastight manner and is filled with a gas for electrical insulation and for electric arc extinction, which gas comprises a mixture of heptafluoroisobutyronitrile and carbon dioxide.

Thus, the gas insulation implements a gas mixture comprising heptafluoroisobutyronitrile and carbon dioxide.

Heptafluoroisobutyronitrile having the formula (I): $(CF_3)_2CFCN$ (I), also written iso-$C_3F_7CN$, or i-$C_3F_7CN$, corresponds to 2,3,3,3-tetrafluoro-2-trifluoromethyl propanenitrile, having CAS registry number: 42532-60-5, presenting a boiling point of −4.7° C. at 1013 hectopascals (hPa) (boiling point as measured by ASTM standard D1120-94 "Standard Test Method for Boiling Point of Engine Coolants").

The relative dielectric strength of heptafluoroisobutyronitrile having formula (I), that is normalized relative to $SF_6$, is 2.2, said dielectric strength being measured at atmospheric pressure, with a DC voltage, between two steel electrodes having a diameter of 2.54 centimeters (cm) and spaced apart by 0.1 cm.

Thus, heptafluoroisobutyronitrile having the formula (I) as described above, that is non-toxic, non-corrosive, non-flammable, and that presents a GWP that is low relative to that of $SF_6$, is endowed with electrical insulation or electric arc extinction properties suitable for enabling it to replace $SF_6$ as an insulation gas and/or arc-extinction gas in high-voltage equipment, in combination with a dilution gas.

The liquid or gas mixture used within the context of the present invention comprises heptafluoroisobutyronitrile and carbon dioxide in predefined proportions.

In the gas mixture used to fill the casing, the carbon dioxide is a dilution gas also known as "mixture gas" or "carrier gas".

Under the conditions of use of the equipment, the pressure inside the casing is of the order of 6 bars to 10 bars for high-voltage equipment and of the order of 0.3 bars to 1.5 bars for medium-voltage equipment. Under such pressure or at low temperatures, heptafluoroisobutyronitrile liquefies and that limits the effectiveness of the electric insulation. That is why a dilution gas such as carbon dioxide is used in a mixture with the heptafluoroisobutyronitrile gas, so as to lower the partial pressure to below the saturated vapor pressure at the minimum service temperature of the equipment.

The liquid or gas mixture used within the context of the present invention may contain nothing other than heptafluoroisobutyronitrile and carbon dioxide and thus be made up of these two components only. In this event, the liquid or gas mixture comprises 2 molar percent (mol %) to 15 mol % of heptafluoroisobutyronitrile and 85 mol % to 98 mol % of carbon dioxide and, in particular, 4 mol % to 10 mol % of heptafluoroisobutyronitrile and 90 mol % to 96 mol % of carbon dioxide.

In a variant, this liquid or gas mixture may contain at least one other element in addition to heptafluoroisobutyronitrile and carbon dioxide. This other element may be any component that is used conventionally in electrical insulation of high- or medium-voltage equipment. Advantageously, such a compound presents a GWP that is equal to 1 or even zero. More particularly, the element for use in the context of the present invention in a mixture with heptafluoroisobutyronitrile and carbon dioxide is selected from among nitrogen, oxygen, air, advantageously dry air, and any mixture thereof. Typically, the other element is oxygen.

In this variant, the liquid or gas mixture comprises 2 mol % to 15 mol % heptafluoroisobutyronitrile, 70 mol % to 97 mol % carbon dioxide and 1 mol % to 15 mol % of at least one other element as described above and in particular 1 mol % to 15 mol % oxygen. In particular, the liquid or gas mixture comprises 4 mol % to 10 mol % heptafluoroisobutyronitrile, 80 mol % to 94 mol % carbon dioxide and 2 mol % to 10 mol % of at least one other element as described above and in particular 2 mol % to 10 mol % oxygen.

The first step of the method of the present invention consists in preparing, in a container (2), a pressurized liquid mixture comprising heptafluoroisobutyronitrile and carbon dioxide in predefined proportions.

The container (2) implemented within the context of the present invention is a container adapted for filling and transporting $CO_2$ in the liquid, gaseous, or even supercritical state. This container may be in the form of a bottle, a cylinder, or some other container, typically being suitable for containing 1 L to 1000 L of liquid, 50 L bottles of the B50 type being most commonly used. This type of container is well known to the person skilled in the art and available from nearly all manufacturers and retailers of liquefied $CO_2$.

Calculating the densities for the liquid mixtures as opposed to the gas mixtures makes it possible to come close to the advantages of step a) of preparing a mixture of components in liquid form.

The density of pure $CO_2$ in the gaseous state is, at atmospheric pressure, 1.87 kg/m³ and 1256 kg/m³ once liquefied. There is therefore a compression ratio of the order of 500. Within the context of gas mixtures implemented within the context of the present invention advantageously comprising $CO_2$ and between 4 mol % and 10 mol % of $i-C_3F_7CN$, this compression ratio between liquid and gas remains similar (see Table 1 below).

TABLE 1

|  | mol % | weight % | Gas density [kg/m³] | Liquid density [kg/m³] |
|---|---|---|---|---|
| Heptafluoro-isobutyronitrile | 100 | 100 | 8.11 | 1350 |
| $CO_2$ | 100 | 100 | 1.87 | 1256 |
| Mixture at 4 mol % | 0.04 | 0.15 | 2.1 | 1259.8 |
| Mixture at 6 mol % | 0.06 | 0.22 | 2.2 | 1261.6 |
| Mixture at 10 mol % | 0.10 | 0.33 | 2.5 | 1265.4 |

Within the context of mixtures comprising $CO_2$ and 4 mol % of $i-C_3F_7CN$, which make it possible to reach minimum service temperatures for the high- or medium-voltage equipment of the order of about −30° C., or even lower than −30° C., without liquefaction of the $i-C_3F_7CN$ portion, the density of the gas is 2.1 kg/m³ and 1260 kg/m³ for the liquid phase.

Considering, as a container (2), a traditional B50-type bottle with a capacity of 50 L and a test pressure of 190 bars, the filling ratio for this type of gas respecting ADR regulations for carriage by road is 0.5 kg/L. This bottle thus contains a maximum of 25 kilograms (kg) of mixture with 4 mol % of $i-C_3F_7CN$, which in an expanded phase represents approximately 12 m³ at atmospheric pressure (25/2.1).

In order to compare it to storage and transport in a gas phase, it is necessary to remain at pressures that do not allow liquefaction of the phase $i-C_3F_7CN$ at −30° C., and that represents a maximum partial pressure of 0.37 bars absolute. In this event, the pressure of the mixture in the container should not exceed 9.3 bars absolute (0.37/0.04), giving a density of 19.6 kg/m³, whereas the B50 bottle has a density of 500 kg/m³ which makes it possible to concentrate the gaseous medium by a factor of 25 (500/19.6).

The preparation of a mixture in the form of a pressurized liquid comprising a predetermined amount of $CO_2$ and $i-C_3F_7CN$ is a conventional step for the person skilled in the art including an accurate measurement of the weights of $CO_2$ and $i-C_3F_7CN$ that may involve the use of flowmeters as well as compression and/or cooling.

Within the context of the step b) of the method of the invention, transfer from the pressurized liquid phase contained in the container (2) is performed by causing the mixture to pass into a supercritical state. For pure $CO_2$, this occurs at a critical temperature of 31° C. and at a critical pressure of 73.8 bars. For mixtures based on $i-C_3F_7CN$ and $CO_2$, the critical temperatures of the mixtures are calculated using equations (1) and (2) combined.

By way of example, for a mixture with 4 mol % of $i-C_3F_7CN$ in $CO_2$, the critical temperature of said mixture is as follows:

$$T_{cri_{mix}} = \frac{0.04*378.5*(273.15+109)}{0.04*378.5+0.96*94} + \frac{0.96*94*(273.15+31)}{0.04*378.5+0.96*94} = 315 \text{ K}$$

The critical temperature of the mixture with 4 mol % of $i-C_3F_7CN$ in $CO_2$ is of 315 kelvin (K), i.e. 42° C. A similar calculation was performed for the various mixtures and the values obtained are shown in Table 2 below:

TABLE 2

| $i-C_3F_7CN$ mole fraction | $T_c$ (° C.) | $P_c$ (bar) |
|---|---|---|
| 0 | 31.0 | 73.77 |
| 0.04 | 42 | 74 |
| 0.06 | 47 | 73 |
| 0.08 | 51 | 72 |
| 0.10 | 55 | 71 |

Step b) of the method of the invention thus consists in heating the pressurized liquid mixture contained in the container (2) to a temperature that is higher than or equal to the temperature for bringing the contained mixture to the supercritical state. In such a state, $CO_2$ and heptafluoroisobutyronitrile mix perfectly, pass into the gaseous state with the density of the liquid and occupy the entire volume of the container in homogeneous manner so as to form just one gas.

To achieve this object, a heater member (4) outside the container (2) and/or a heater member (5) inside the container (2) is/are used.

In a first implementation, heating is performed by a member (4) located outside the container (2) i.e. mounted on the walls of the container (2) or positioned in the proximity thereof. Such a member may be in the form of a heater belt or a heater cable of the resistive or inductive type or that is heated by passing a fluid heated to a temperature that is adapted to heat the mixture contained in the container (2) to the desired temperature. In a variant, this outer heater member (4) may be in the form of a temperature-stabilized box arranged around the container (2).

In a second implementation, this heating is performed by a heater member (5) inside the container (2). Such a member is typically presented in the form of a heater resistor positioned in the inside volume defined by the container (2). When heating is performed by means of an inside heater member (5), the container may further present, mounted on its walls or positioned in the proximity thereof, a thermal insulation system (10) of the thermally insulating housing type.

In a third implementation, heating is performed at the same time by a heater member (4) outside the container (2) and a heater member (5) inside the container (2).

The heating power of the container (2) is calculated as a function of the vaporization enthalpy of the gas mixture, the required mass flow, and the heat losses of the entire system. For a mixture comprising $CO_2$ and 4 mol % of i-$C_3F_7CN$, the vaporization enthalpy is of approximately 15.7 kJ/mol. For a transfer rate of the order of 50 kg/h, a heating power of approximately 5 kW is therefore necessary.

In a first implementation, the heating power of the container (2) may be adjusted and/or regulated on the basis of the measured molar ratio between i-$C_3F_7CN$ and $CO_2$ present in the gas mixture while said gas is transferred between the container (2) and the casing (1). To this end, the transfer circuit (3) may present means (8) for measuring the molar ratio between i-$C_3F_7CN$ and $CO_2$ in the gas mixture, typically, downstream from the expansion member (6) and upstream of the casing (1) to be filled. Any means suitable for measuring a molar ratio in a gas mixture with several components can be used within the context of the present invention. By way of illustrative and non-limiting examples, mention may be made of an in-line gas chromatograph, a gas analyzer, an infra-red spectrometer, an analyzer based on the measurement of the speed of sound in the gas, a densitometer, a mass spectrometer, or any combination thereof. If the measured molar ratio is different from the predetermined value of the molar ratio, a tap or a valve (11) such as a solenoid valve placed upstream from the casing (2) to be filled is closed, manually or automatically, in order to prevent filling of the casing, and the heating power of the container (I) is regulated so that the measured molar ratio reaches the value of the predetermined molar ratio.

In a second implementation, the heating power of the container (2) may be adjusted and/or regulated on the basis of the measured temperature of the gas mixture in the container (2) during transfer step c) and before its expansion. Indeed, in order to maintain the advantages related to the use of the supercritical mixture, it is necessary during the transfer step c) and before the gas expands, for the temperature of the gas mixture to remain at a value that is greater than or equal to the critical temperature of the mixture. Any means known to the person skilled in the art for measuring the temperature of a gas of the temperature sensor type may be used for this monitoring. Such a temperature sensor must be located as close as possible to the mixture in a supercritical state. Typically this temperature sensor (9) is located at the bottom of the container (2). If the measured temperature is lower than the critical temperature of the mixture, a tap or a valve (11) such as a solenoid valve placed upstream from the casing to be filled (2) is closed, manually or automatically, in order to prevent filling of the casing, and the heating power of the container (1) is regulated so that the measured temperature reaches a value that is greater than or equal to the critical temperature of the mixture.

Finally, the heating power of the container (2) may be adjusted and/or regulated on the basis of the measured temperatures of the heater members (4, 5). Thus, the heater members (4, 5) within the context of the method and of the installation of the invention may present temperature sensors suitable for or intended for stopping heating in the event of a limit value defined by the operator being exceeded.

In addition, the installation of the invention advantageously presents at the container (2) a rupture disk designed to avoid an overpressure in said container in the event of failure of the heat regulation system. Such a rupture disk is typically rated at 120 bars.

Finally, it should be observed that the installation of the present invention contains one or more temperature safety features so that the gas mixture never reaches a temperature determined by the operator, which is typically 65° C.

During step c) of the method of the invention, the gas mixture obtained during step b) is brought from the container (2) to the casing (1) via a transfer circuit (3). During said transfer, the gas mixture must be expanded until it presents a pressure value that is adapted to filling the casing (1). This expansion uses an expansion member (6) that is configured to lower the pressure of the gas mixture by a value that is greater than or equal to the critical pressure of the mixture up to a given value lying in the range 1 bar to 15 bars. Any expansion member (6) known to the person skilled in the art is suitable for use within the context of the present invention. Such a member of the pressure-reducing type presents a chamber or zone of high pressure (HP) arranged downstream from the container (2) and a chamber or zone of low pressure (LP) arranged upstream from the casing (1).

At the same time, the temperature of the gas mixture must be maintained at a temperature that is higher than the liquefaction temperature of i-$C_3F_7CN$ at its partial pressure in the transfer circuit (3) in order to avoid depositing liquid i-$C_3F_7CN$ in the transfer circuit (3), which would lead to a modification of the molar ratio between i-$C_3F_7CN$ and $CO_2$ in the remaining gas mixture. However, when the valve or the tap (12) isolating the container (2) of the transfer circuit (3) is open, the gas mixture initially contained in the container passes through the transfer circuit (3) where it cools by Joule-Thomson (expansion) effect. In order to compensate for this cooling and maintain the gas mixture at a temperature that is higher than the liquefaction temperature of i-$C_3F_7CN$, the transfer circuit (3) presents a system (7) that is suitable for keeping the gas mixture at a temperature that is higher than the liquefaction temperature of heptafluoroisobutyronitrile, which system is of the gas heater type and in particular of the $CO_2$ heater type. The temperature-regulating action of this system may be supplemented by using a transfer circuit (3) having all or some of its ducts or pipes being heating ducts or pipes. In the method or the installation of the invention, the heating ducts or pipes are typically at a temperature of about 30° C. (i.e. 30° C.±4° C.). In a particular implementation, the transfer circuit (3) presents a gas heater (7) placed downstream from the valve or the tap (12) and upstream from the expansion member (6), and the pipes or ducts of the transfer circuit downstream from the expansion member (6) are heating pipes or ducts in order to compensate for the cooling of the gas mixture due to its expansion. In another particular implementation, the transfer circuit (3) presents a gas heater (7) placed downstream from the valve or the tap (12) and upstream from the expansion member (6) and the set of pipes or ducts forming the transfer circuit (3) are heating pipes or ducts.

When the tap or the valve (11) of the solenoid valve type is open, the gas mixture comprising $CO_2$ and i-$C_3F_7CN$ then fills the casing (1). During this filling step, the air initially present in the casing (1) is expelled by the gas mixture. In a variant, before the filling step, void is made in the inside volume of the casing (1) (0-0.1 kPa). The system forming the object of the present invention can also be used to add additional gas into the casing (1) on site.

Figure 1:
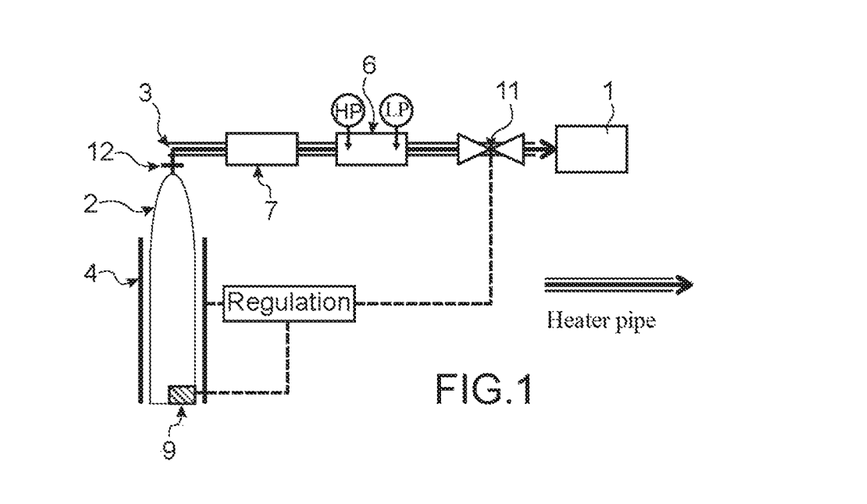
FIG. 1 is a fragmentary diagram showing the structure and the operation of a first example of a filling installation of the invention in which the heating system is outside the container and regulation of heating power is conditioned by the measured temperature of the gas mixture in the container (2).
Figure 2:
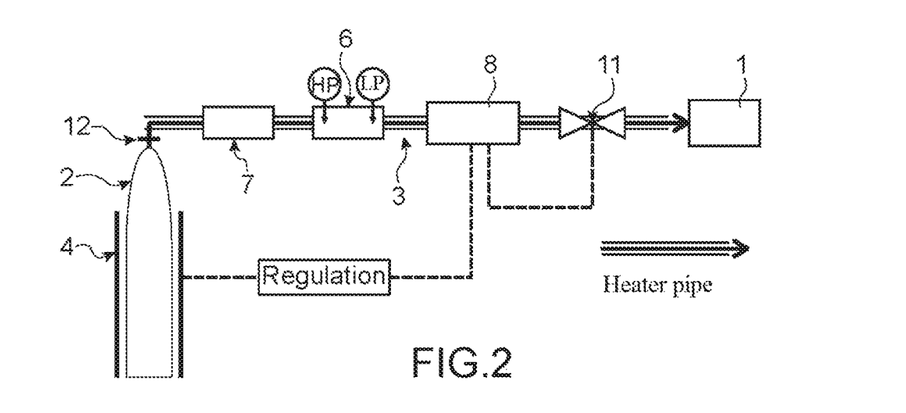
FIG. 2 is a fragmentary diagram showing the structure and the operation of a second example of a filling installation of the invention in which the heating system is outside the container and regulation of heating power is conditioned by directly measuring the molar ratio between the heptafluoroisobutyronitrile and the carbon dioxide in the gas mixture.
Figure 3:
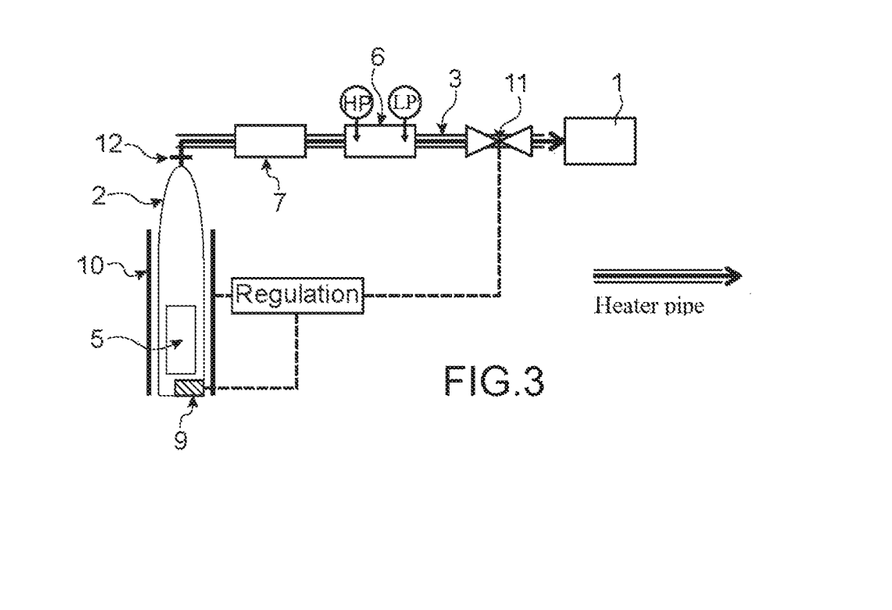
FIG. 3 is a fragmentary diagram showing the structure and the operation of a third example of a filling installation of the invention in which the heating system is inside the container and regulation of heating power is conditioned by the measured temperature of the gas mixture in the container (2).
Figure 4:
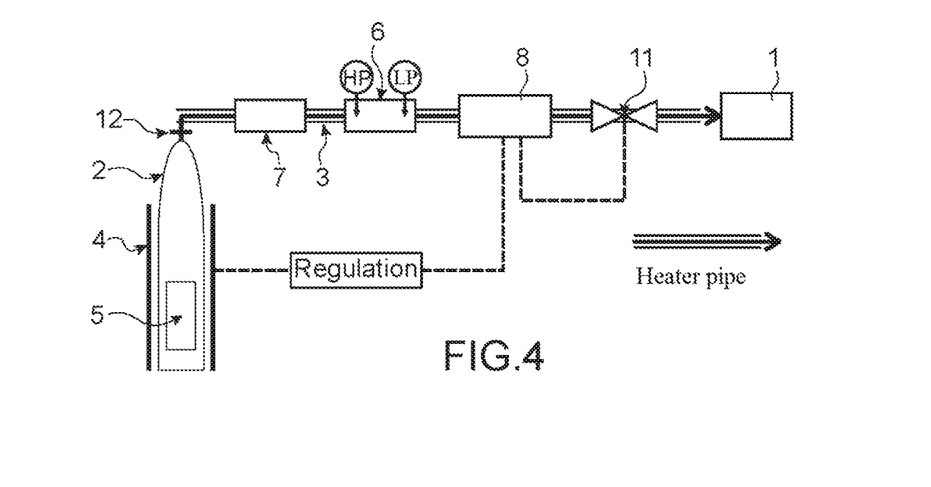
FIG. 4 is a fragmentary diagram showing the structure and the operation of a fourth example of a filling installation of the invention in which the heating system is inside the container and regulation of heating power is conditioned by directly measuring the molar ratio between the heptafluoroisobutyronitrile and the carbon dioxide in the gas mixture.

FIGS. 1 to 4 show four installations of the invention, on the following principles:
heating the container (2) of the transport container or bottle type, containing the mixture of $CO_2$ and i-$C_3CF_7CN$ in the pressurized liquefied state until it reaches the critical temperature of the mixture by using the external heater member (4) of the external heater belt type (FIGS. 1 and 2) or the internal heater member (5) of the internal heater resistor type combined with a thermal insulation system (10) of the thermally insulating housing type surrounding the container (2) (FIGS. 3 and 4);

once the $CO_2$ and i-$C_3F_7CN$ mixture is in gaseous form and in a supercritical state, opening the valve or the tap (12) isolating the container (2) from the transfer circuit (3), so that the gas mixture is introduced into the transfer circuit (3);

passing the gas mixture through a gas heater (7) of the $CO_2$ heater type in order to compensate for the cooling of the gas mixture;

passing the gas mixture through an expander (6);

transferring the gas mixture to the transfer circuit (3) via heating pipes so as to compensate for cooling of the gas by Joule-Thomson (expansion) effect;

the transfer circuit (3) contains a solenoid valve (11) controlled by measuring the critical temperature of the gas mixture at the container (2) (for FIGS. 1 and 3) or by directly measuring the ratio between i-$C_3F_7CN$ and $CO_2$ (for FIGS. 2 and 4). The solenoid valve (11) is opened to allow the casing of the equipment (1) to be filled only when the temperature of the mixture is at least equal to the critical temperature of the mixture, or the ratio is equal to the target value; and the heating power is controlled by measuring the temperature of the gas mixture in the container (2) at the measuring means (9) (for FIGS. 1 and 3) or by directly measuring the ratio between i-$C_3F_7CN$ and $CO_2$ at the measuring means (8) (for FIGS. 2 and 4).

The installations of FIGS. 1 to 4 contain temperature safety features so that the gas mixture never reaches 65° C.

In addition, the installations of FIGS. 1 to 4 contain a rupture disk rated at 120 bars in order to avoid an overpressure in the container (2) of the bottle or transport container type in the event of any failure of the heat regulation system.

In the FIG. 1 installation, the heater system (4) is outside the container (2) (transport container or bottle). Heating power regulation is conditioned by measuring the temperature of the gas mixture in the container (2) at the measurement means (9).

The FIG. 2 installation is a variant of the FIG. 1 installation in which regulation of the heating power is conditioned by directly measuring the ratio between i-$C_3F_7CN$ and $CO_2$ at the measurement means (8).

In the FIG. 3 installation, the heating system (5) is inside the container (2) (transport container or bottle) that is combined with a thermal-insulation system (10) of the thermally insulating housing type surrounding the container (2). Heating power regulation is conditioned by measuring the temperature of the gas mixture in the container (2) at the measurement means (9).

The FIG. 4 installation is a variant of the FIG. 3 installation in which heating power regulation is conditioned by directly measuring the ratio between i-$C_3F_7CN$ and $CO_2$ at the measurement means (8).

What is claimed is:

1. A method of filling a closed casing containing at least one electrical component of equipment for a high-or medium-voltage electricity transmission line with a gas mixture comprising heptafluoroisobutyronitrile and carbon dioxide in predefined proportions, said method comprising:

a) preparing, in a container, a pressurized liquid mixture comprising heptafluoroisobutyronitrile and carbon dioxide in predefined proportions;

b) heating, in the container, the pressurized liquid mixture prepared in a) until it reaches a temperature that is higher than or equal to the critical temperature of the mixture whereby a gas mixture comprising heptafluoroisobutyronitrile and carbon dioxide in predefined proportions is obtained; and c) transferring said gas mixture obtained in b) from the container to the casing via a transfer circuit in which the gas mixture is decompressed and maintained at a temperature that is higher than the liquefaction temperature of heptafluoroisobutyronitrile at its partial pressure in the transfer circuit before it enters the casing to be filled.

2. The method according to claim 1, wherein heating is performed during b) by a heater member outside the container.

3. The method according to claim 1, wherein heating is performed during b) by a heater member inside the container.

4. The method according to claim 1, wherein, during c), the molar ratio between heptafluorobutyronitrile and carbon dioxide in the gas mixture is measured.

5. The method according to claim 1, wherein, during c), the temperature of the gas mixture in the container is measured.

6. The method according to claim 1, wherein the heating power during a) is adjusted and/or regulated on the basis of:

a molar ratio between heptafluoroisobutyronitrile and carbon dioxide which is measured during c);

a temperature of the gas mixture in the container which is measured during c); or a measured temperature of a heater members.

7. The method according to claim 1, wherein the gas mixture comprising heptafluoroisobutyronitrile and carbon dioxide further comprises oxygen.

8. An installation for filling a closed casing containing at least one electrical component of equipment for a high- or medium-voltage electricity transmission line with a gas mixture comprising heptafluoroisobutyronitrile and carbon dioxide in predefined proportions, the installation comprising:

a container configured for containing a mixture comprising heptafluoroisobutyronitrile and carbon dioxide in predefined proportions;

a heater member configured for heating the mixture comprising heptafluoroisobutyronitrile and carbon dioxide in predefined proportions present in the container in pressurized liquid form until it reaches a temperature that is higher than or equal to the critical temperature of the mixture whereby a gas mixture comprising heptafluoroisobutyronitrile and carbon dioxide in predefined proportions is obtained; and a transfer circuit configured for transferring the gas mixture comprising heptafluoroisobutyronitrile and carbon dioxide in predefined proportions from the container to the casing, the transfer circuit fluidly connecting said container with the casing and the transfer circuit having an expansion member configured for reducing the pressure of the gas mixture to a determined value to fill the casing for maintaining the gas mixture at a temperature that is higher than the liquefaction temperature of heptafluoroisobutyronitrile at its partial pressure in the transfer circuit, the filling installation comprising one or more temperature safety features.

9. The filling installation according to claim 8, wherein the transfer circuit has means configured for measuring the molar ratio between heptafluoroisobutyronitrile and carbon dioxide in the gas mixture.

10. The filling installation according to claim 8, being wherein the transfer circuit presents a temperature sensor configured for measuring the temperature of the gas mixture in the container.

\* \* \* \* \*